United States Patent [19]
Pritulsky

[11] 3,857,349
[45] Dec. 31, 1974

[54] METHOD FOR FABRICATING A THREADED TAP BY STAMPING

[75] Inventor: James Pritulsky, Harrisburg, Pa.

[73] Assignee: AMP Incorporated, Harrisburg, Pa.

[22] Filed: July 19, 1973

[21] Appl. No.: 380,921

[52] U.S. Cl. .................. 113/119, 85/1 L, 85/32 V
[51] Int. Cl. ........................................ B21d 53/24
[58] Field of Search ............ 113/119; 339/263, 268, 339/232; 85/32 V, 1 L, 85

[56] References Cited
UNITED STATES PATENTS

| | | | |
|---|---|---|---|
| 186,503 | 1/1877 | Snook | 85/1 L |
| 2,106,595 | 1/1938 | Draving | 339/263 R |
| 3,665,881 | 5/1972 | Koch et al. | 113/119 |

FOREIGN PATENTS OR APPLICATIONS

| | | | |
|---|---|---|---|
| 889,187 | 9/1943 | France | 85/1 L |

Primary Examiner—Richard J. Herbst
Attorney, Agent, or Firm—AMP Incorporated

[57] ABSTRACT

A method for fabricating a threaded tap from a continuous supply of flat stock material comprising the steps of feeding a portion of the flat stock to a work station, stamp cutting a blank having two appendages thereon with a rectangular tab on each appendage, cold working each of the two tabs into half cylindrical configurations, cold working threads into each of the two half cylindrical elements, and then folding said appendages about fold lines selected to cause said threaded half cylindrical elements to come together to form one commplete, cylindrical element, with the threads properly aligned to receive a bolt or screw.

6 Claims, 17 Drawing Figures

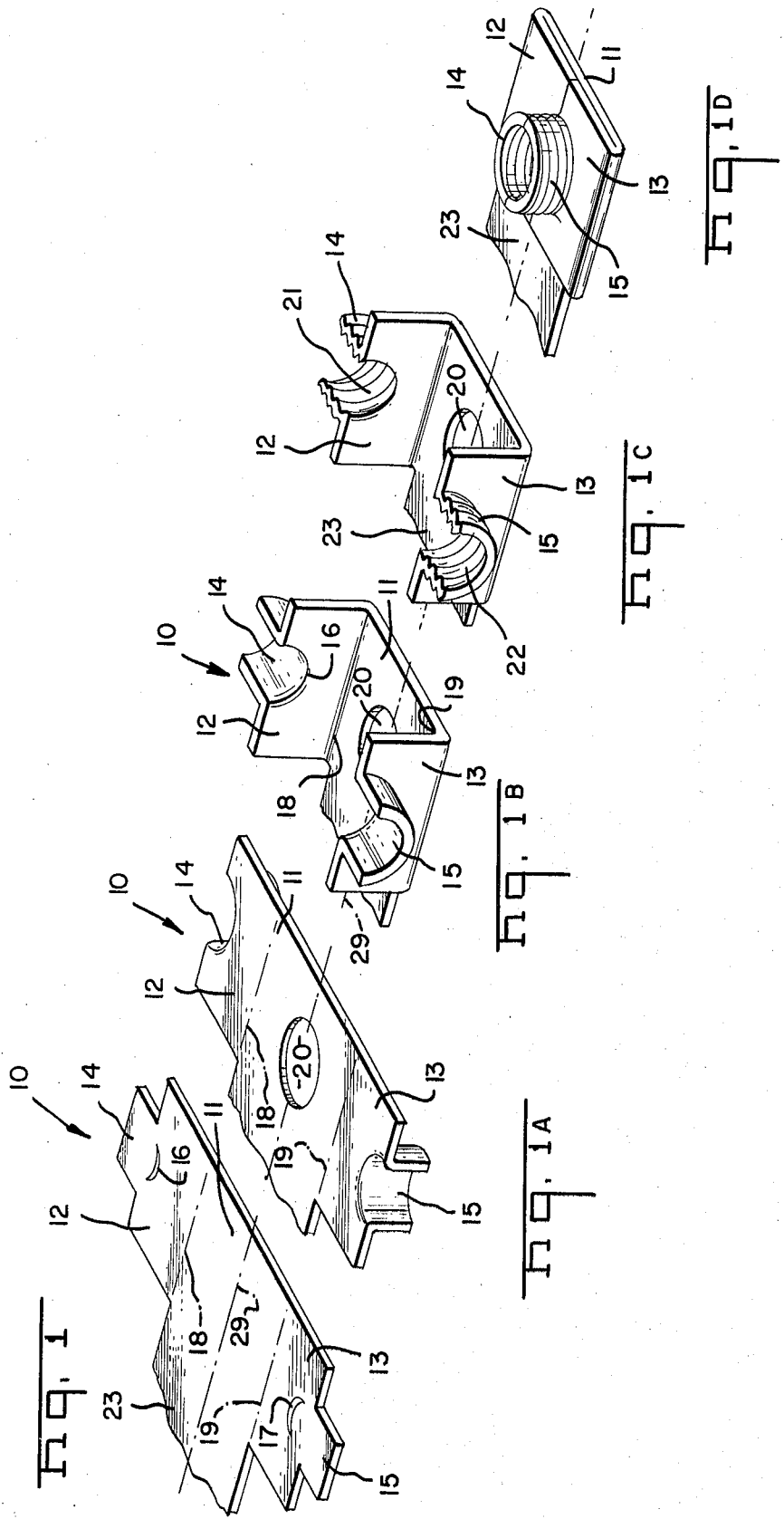

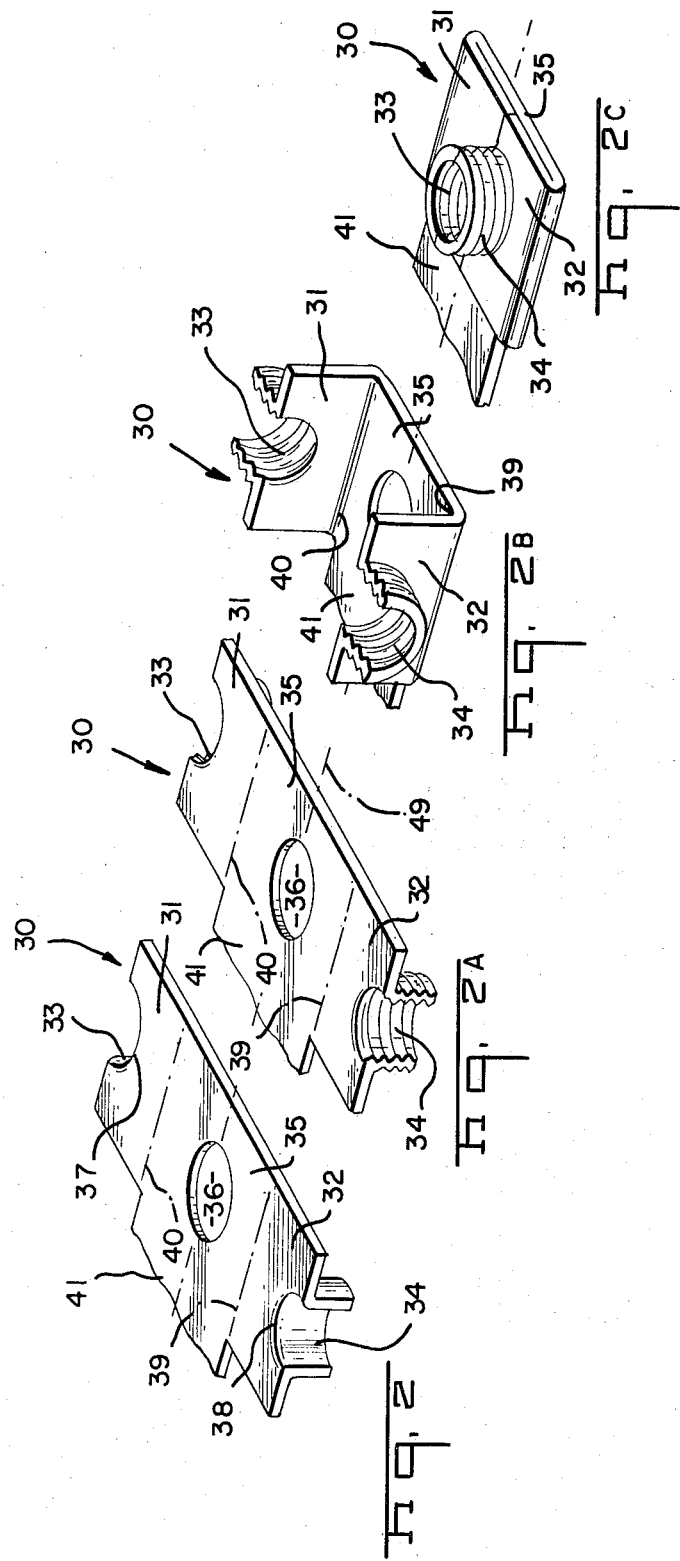

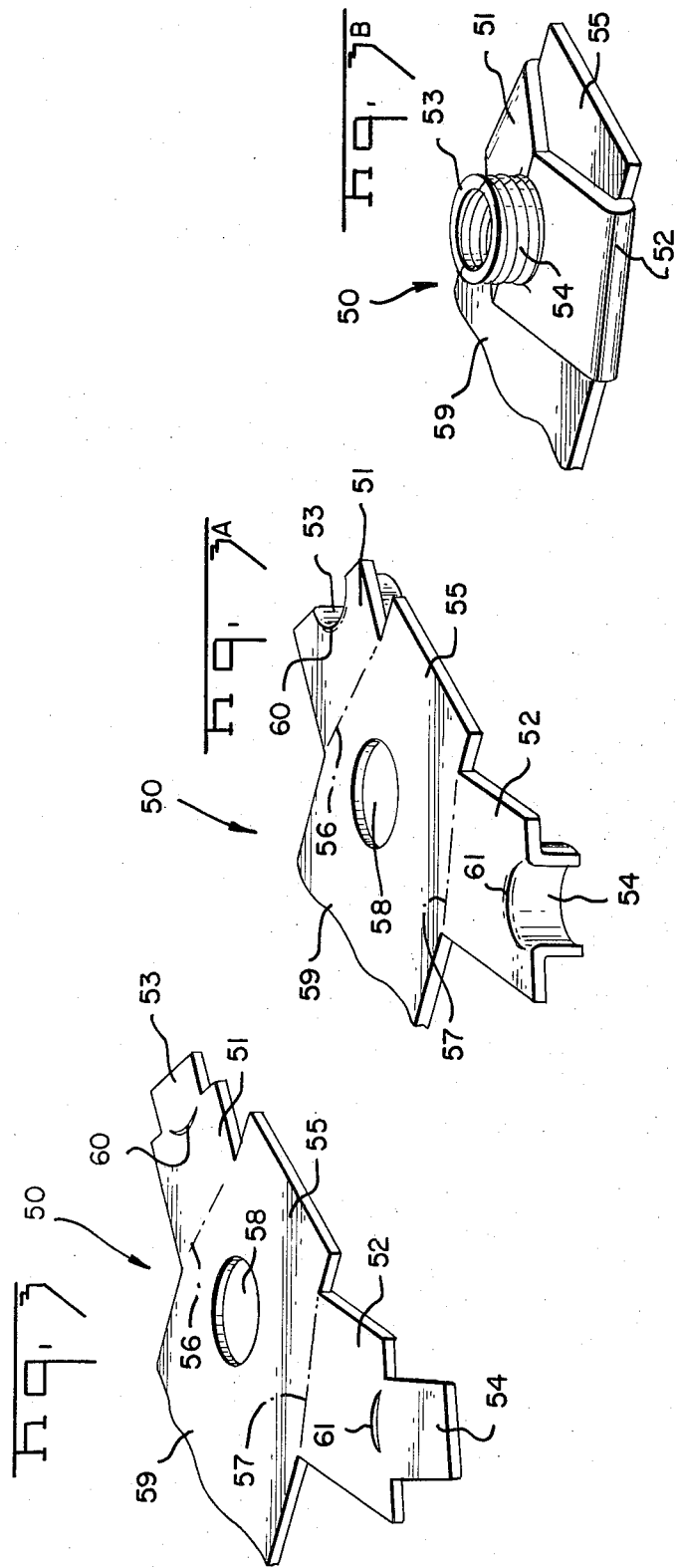

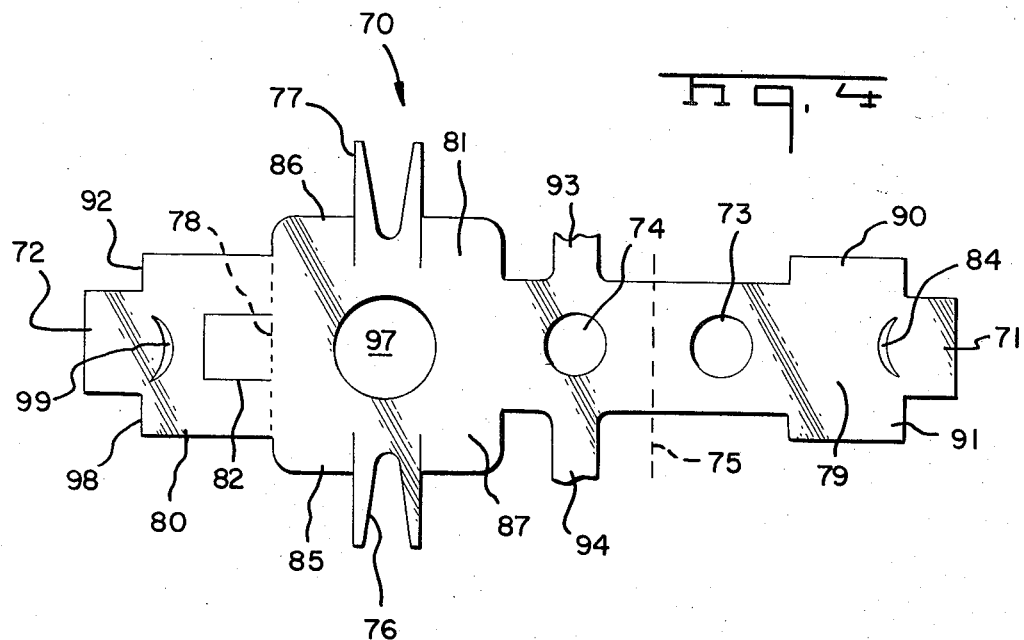
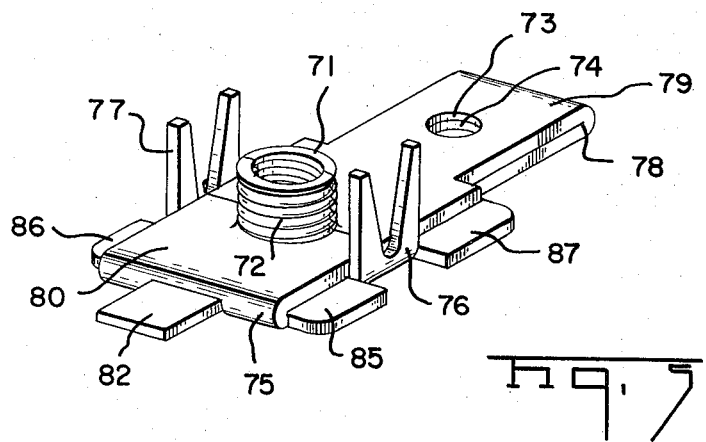

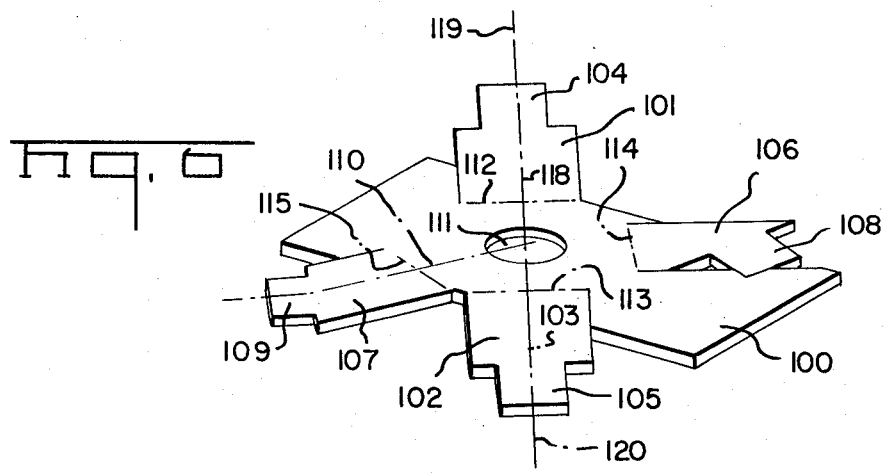
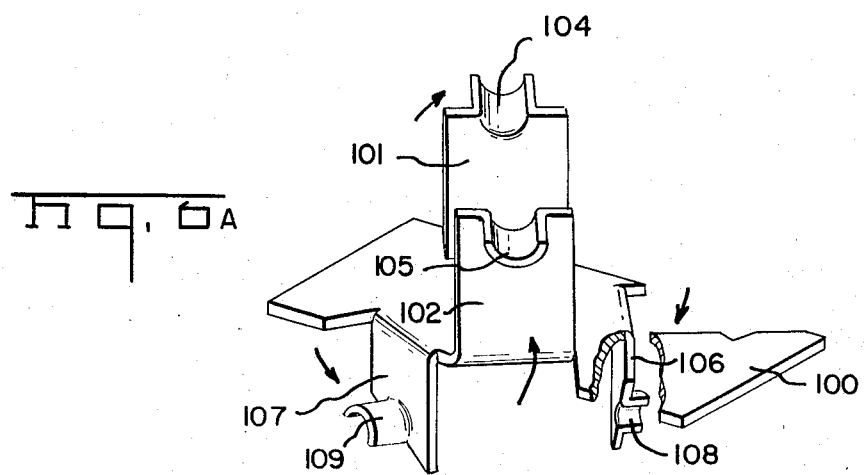
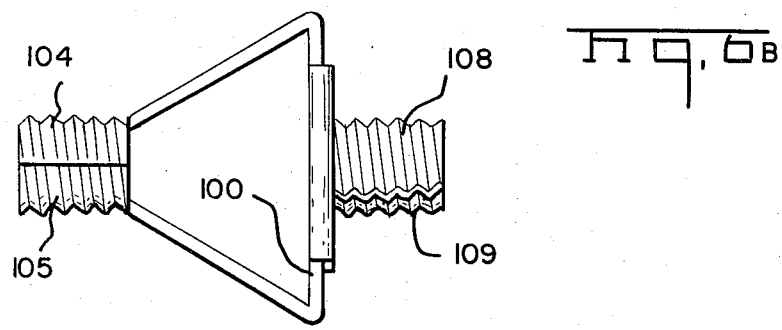

3,857,349

METHOD FOR FABRICATING A THREADED TAP BY STAMPING

BACKGROUND OF THE INVENTION

This invention relates generally to a method for fabricating a threaded aperture by cutting and stamping operations and more particularly to a method for fabricating threaded taps from a continuously fed supply of flat stock material.

In the prior art there are known methods for forming a threaded tap by cutting and stamping means. Such methods usually involve the piercing of the flat metal with a die or tap-like tool having threads thereon. Once the tap has penetrated the flat stock it is rotated to form the threads by a cold working action on the walls formed around the tap when the flat stock was penetrated.

The formation of threads by this method has been used commercially for some time. However, the rate at which such threaded taps can be fabricated has an upper limitation of about 75 taps per minute. Furthermore the number of threads which can be formed by this method is limited to two, or at the most three threads, since the material in which the threads are formed is limited to that displaced from the flat stock when penetrated by the tap.

OBJECTS AND STATEMENT OF THE INVENTION

It is a primary object of the invention to provide a method of fabricating threaded taps by stamping flat metal stock and at a much higher production rate than has heretofore been known.

A second object of the invention is to provide a method of fabricating threaded taps in flat stock material having two or more revolutions of thread.

A third aim of the invention is to provide a method of stamping from flat stock a product which includes not only a threaded tap of two or more threads but also includes at least one other functional element, such as an electrical terminal integrally formed therewith.

A fourth purpose of the invention is the improvement of methods for forming threaded taps from flat stock generally.

In accordance with one form of the invention a threaded tap is formed by a method comprising the steps of: feeding successive portions of a strip of flat stock into at least one work area; stamp cutting the portion of said flat stock in the said work area to form an element having appendages thereon, with each appendage being shaped into a half cylindrical configuration truncated at one end and having the other end secured to the main body of said element; cold working the half cylindrical sections to form threads thereon both internally and externally; and then rotating the two threaded half cylindrically shaped appendages along folding lines which define arcuate paths selected to bring said half cylindrical sections together in a manner as to form a complete cylindrical section with continuous threading therearound.

In accordance with a particular feature of the invention the cylindrical sections and the threads thereon are formed from the appendages after the blank shape of the element has been cut and is still in flat form. Alternatively, a portion of the folding of the appendages is done prior to either the forming of the cylindrical sections or the forming of the threads on the half cylindrical sections, or both. The remainder of the folding is then done to bring the two half cylindrical sections together to form the resultant single, threaded cylindrical section.

BRIEF DESCRIPTION OF THE DRAWINGS

The above-mentioned and other objects and features of the invention will be more fully understood from the following detailed description thereof when read in conjunction with the drawings in which:

FIGS. 1, 1a, 1b, 1c and 1d show the fabrication of a threaded tap in five stages;

FIGS. 2, 2a, 2b, and 2c show the formation of a threaded tap using a somewhat different order of folding and stamping than is shown in FIGS. 1 through 1d;

FIGS. 3, 3a, and 3b show the formation of a threaded tap in four stages where the lines of folding are not parallel;

FIG. 4 shows a plan view of a blank stamping that will become, after appropriate folding and cold working, a terminal having a threaded tap thereon as shown in FIG. 5;

FIG. 5 is a perspective view of an electrical terminal with a threaded tap formed thereon as a result of being processed by one of the methods shown in FIGS. 1 – 1d or 2 – 2c; and FIGS. 6, 6a and 6b illustrate a form of the invention wherein two threaded taps are formed with a spacing therebetween.

DESCRIPTION OF THE METHODS

Referring now to FIG. 1 there is shown a blank 10 from which the threaded tap structure of FIG. 1c will be formed as a result of the steps represented in FIGS. 1a, 1b and 1c.

The blank in FIG. 1 is initially formed from a sheet of flat stock which can be fed continuously to a work station (not specifically shown). At this work station the blank of FIG. 1 is formed and comprises a main body 11 with two elements 12 and 13 extending therefrom. Attached to each of these two elements 12 and 13 are additional elements 14 and 15. Two moon-shaped slits 16 and 17 are also stamped in the blank at this first work station.

Next, preferably at the same work station, by means of stamping and cold working the element 10 is transformed into the configuration shown in FIG. 1a. In FIG. 1a an aperture 20 has been stamped into the main body 11. Also the tabs 14 and 13 have been cold worked to form the half cylindrical sections 14 and 15. In the forming of half cylindrical sections 14 and 15 the moon-shaped slits 16 and 17 have become closed. The function of the moon-shaped slits 16 and 17 is to absorb the displaced material in elements 12 and 13 during the formation of the half cylinders 14 and 15.

The next step is shown in FIG. 1b and involves the folding of the elements 12 and 13, 90° about fold lines 18 and 19. The step of FIG. 1b preferably is also performed at the same work station as the step shown in 1a although it could be performed at some other suitably prepared work station. It is to be noted that in the formation of the product shown in FIG. 1b the fold lines 18 and 19 are positioned symmetrically around centerline 29 which passes through the center of aperture 20.

In the next step shown in FIG. 1c the two half cylinders 14 and 15 are cold worked by a stamping process to form threads therein, said threads being identified by reference characters 21 and 22.

In the next step the elements 12 and 13 are folded through another 90° so that the two half cylinders 14 and 15 come together to form a complete cylinder as shown in FIG. 1d. The threads formed in half cylinders 14 and 15 are configured to be aligned when the final fold is made, as shown in FIG. 1d, and the half cylinder sections 14 and 15 brought together. The structure of FIG. 1b will receive a bolt having suitably mated threads.

In the process shown in FIGS. 1 through 1d, it is to be noted that the half cylindrical portions are formed in the blank before any folding is done. The elements 12 and 13 are then folded through a suitable arc, which is selected to be 90° in FIG. 1b. If desired, and with suitable adaptation at the work station, the partial fold of the elements 12 and 13 can be made through some arc other than 90°. The formation of threads in the half cylindrical sections 14 and 15 is done after the partial fold shown in FIG. 1b. In other words, the threads are formed after the partial folding has been done. After formation of the threads the folding is completed to form the complete cylindrical section shown in FIG. 1d.

In FIGS. 2 through 2c, a modification of the process is shown. In this modification, the half cylindrical sections and the threads therein are formed before any folding is done, as shown in FIGS. 2 and 2a.

Then in FIGS. 2b and 2c, the folding is accomplished. While only a 90° fold is shown in FIG. 2b, and the remaining fold in FIG. 2c, it is to be understood that folding from the configuration shown in FIG. 2a to the final product shown in FIG. 2c can be done in one operation.

As in the method shown in FIGS. 1 through 1d, the folding lines 40 and 39 of the process of FIGS. 2 through 2c, are symmetrical about a centerline 49 which passes through the aperture 36 formed in main element 35 of the blank.

Referring now to FIGS. 3 through 3b, there is shown the various stages of completion of the product made by another modification of the invention in which the foldable elements containing the half cylinder threaded elements are not positioned symmetrically about a centerline in the main body of the product, nor are the fold lines parallel to each other. More specifically, in FIG. 3 there is shown the blank containing the foldable elements 51 and 52 attached to which are elements 53 and 54 from which the threaded tap is made. It will be observed that the fold lines 56 and 57, about which the elements 51 and 52 will be folded, are not parallel to each other nor are they symmetrically spaced about a centerline running through the aperture 58. In FIG. 3 the elements 53 and 54 are shown as having been worked into half cylinder configurations, as in the processes of FIGS. 1 and 2. From the configuration of FIG. 3a the half cylinder elements 53 and 54 are cold worked to form threads thereon and then the result folded along lines 56 and 57 to obtain the completed product shown in FIG. 3b.

Alternatively, in FIG. 3a, the elements 51 and 52 could first be folded about lines 56 and 57 towards each other through a suitable arc, such as 90°, and then the threads cold worked into the half cylindrical sections 53 and 54. Subsequently, the folding of the elements 51 and 52 could be completed to form the finished product shown in FIG. 3b. The slits 60 and 61 perform the same function as do the slits 16 and 17 of FIG. 1.

In FIG. 4 there is shown a blank designed to produce the product of FIG. 5. The structure of FIG. 5 contains a threaded tap consisting of the two half cylindrical sections 71 and 72. The bifurcated tabs 76 and 77 can be employed as strain relief means for a pair of conductors passing therethrough and having for example, spade terminals (not shown) positioned over the threaded tap 71 – 72. A bolt or screw, (not shown) can then be screwed into the tap 71, 72 to hold the spades securely therein. Aperture 97 lies below tap 71, 72.

In FIG. 4 the process of the present invention is applied in the following manner. The tabs 71 and 72 are first formed into threaded half cylindrical sections as shown in FIG. 5. Subsequently, the element 79 is folded over the centerline 75 so that aperture 73 coincides with aperture 74. Further, the elements 90 and 91 are thereby positioned part way across the element 81 and more specifically, extend almost to the centerline 96 of the bases of bifurcated elements 77 and 76, respectively.

On the other side of the centerline 96 the element 80 is folded about the fold line 78 so that the shoulders 92 and 98 thereof extend almost to said centerline 96.

The tab 82 is cut from the main flat stock as indicated in FIG. 4. The quarter moon-shaped slots 84 and 99 provide the same function as the quarter moon slots 16 and 17 of FIG. 1, i.e., they provide the necessary room for the expansion of the flat stock material when the elements 71 and 72 are formed into half cylindrical sections.

The elements 93 and 94 represent the carrier means needed to provide a continuous flow of blanks such as the blank shown in FIG. 4.

Referring now to FIGS. 6 and 6a there are shown two stages of fabrication of a product formed by the method of the invention and which has two threaded taps, one tap being on one side of the supporting plate 100 and the other tap being on the other side of said plate 100.

More specifically, the tabs 108 and 109 are first formed into threaded, half cylindrical sections and then the elements 106 and 107, which hold the cylindrical half sections 108 and 109, are folded about fold lines 114 and 115 to create the threaded tap 108, 109 of FIG. 6b. FIG. 6a shows the product after the folding is partially completed.

To create the second threaded tap 104, 105 of FIG. 6b the tabs 104 and 105 of FIG. 6 are first formed into threaded, half cylindrical sections. Then the elements 101 and 102, to which the tabs 104 and 105 are attached, are folded about fold lines 112 and 113. Since the combined lengths of tabs 101 and 102 exceed the distance between the fold lines 112 and 113 along any line parallel to center line 118, the half cylindrical sections 104 and 105 will meet at a position above the surface of supporting plate 100, as shown in FIG. 6b.

It is to be understood that the forms of the invention shown and described herein are but preferred embodiments thereof and that various changes in the order of the steps of the methods can be made without departing from the spirit and the scope of the invention.

What is claimed is:

1. A method for forming an electrical terminal having a cylindrically shaped element with internal and external threads thereon from a continuously fed supply of flat stock material and comprising the steps of:

feeding a predetermined section of said flat stock material into at least one given work area containing cutting and forming dies;

cutting the predetermined section of flat stock into a shape having thereon first and second rectangularly shaped tabs of equal shape and positioned such that corresponding lines of each rectangularly shaped tab are symmetrical mirrored about a centerline lying therebetween;

forming corresponding portions of each tab into curved surfaces which are mirrored images of each other about said centerline to define a pair of truncated, half cylinders, with a first end of each half cylinder being integrally secured to the remainder of said section of flat stock and the second end thereof terminating in a plane substantially normal to the longitudinal axis of said half cylinder;

cold working the half cylinders to form threads thereon; and folding said half cylinders towards each other through a predetermined arc and about folding lines located in said remainder of said section and bisecting those portions of said remainder of said section of said flat stock lying between said centerline and the junctions of said tabs and said section so that the concave surfaces of each of said half cylinders approach each other and the corresponding longitudinal edges of each half cylinder are spatially positioned substantially coincident with each other to form a complete, truncated, threaded cylinder.

2. A method for making threaded, cylindrically shaped elements from a sheet of flat stock material and comprising the steps of:

feeding successive portions of said flat stock into at least one work area;

stamp cutting the portion of said flat stock which is in said work area to form at least one pair of appendages thereon and an aperture positioned between said two appendages;

cold working a section of each appendage into a half cylinder configuration which is truncated in a plane normal to the rotational axis of the half cylinder at the first end thereof, and having the second end thereof secured to the remainder of said portion of flat stock;

folding each of said appendages about predetermined folding lines and through a portion of an arcuate path of a given arcuate length selected to eventually bring said half cylinder configurations together to form a complete cylindrical section when said appendages are folded completely through said given arcuate length;

said folding lines bisecting straight lines which join the midpoints of said appendages where they in turn join said remainder of said portion of said flat stock and the center of said aperture;

said straight lines having a length more than twice that of the diameter of said aperture;

cold working said half cylindrical configurations at an intermediate point in their arcuate paths to form threads thereon;

folding said appendages along said folding lines through the remainder of said given arcuate length to bring said half cylindrical configurations together to form a complete cylindrical section positioned over said aperture and with the threads formed thereon being properly aligned to receive a mating threaded element.

3. A method for fabricating cylindrically shaped elements, threaded both internally and externally, from a sheet of flat stock and comprising the steps of:

feeding successive portions of said flat stock into at least one work area;

stamp cutting the portion of said flat stock which is in said work area to form two appendages thereon and an aperture positioned between said two appendages;

cold working a section of each of said two appendages into a half cylinder configuration which is truncated at one end thereof, and having the other end thereof secured to the remainder of said portion of flat stock;

cold working said half cylindrical configurations to form threads thereon both internally and externally;

folding said appendages along selected folding lines through a given arcuate path to bring said half cylindrical configurations together to form a complete cylindrical section positioned over said aperture and with the threads formed thereon being properly aligned to receive a mating threaded element;

said folding lines bisecting straight lines which join the midpoints of said appendages where they in turn join said remainder of said portion of said flat stock and the center of said aperture;

said straight lines having a length more than twice that of the diameter of said aperture.

4. A method for fabricating cylindrically shaped elements, threaded internally and externally, from a sheet of flat stock and comprising the steps of:

feeding successive portions of said flat stock into at least one work area;

stamp cutting said portion of said flat stock in said work area to form an element comprising a main body having at least one pair of appendages, with each appendage having a tab thereon and also to form an aperture between said pair of appendages;

shaping each of said tabs into a half cylindrical configuration truncated at one end thereof in a plane normal to the rotational axis of the half cylindrical configuration and having the other end thereof secured to the main body of said element;

cold working said half cylindrical configurations to form threads thereon; and folding said threaded half cylinder shaped configuration about predetermined folding lines along an arcuate path selected to bring said half cylinder sections together to form a complete cylindrical section over said aperture and having continuous threading;

said folding lines bisecting straight lines which join the midpoints of said appendages where they in turn join said main body of said element and the center of said aperture;

said straight lines having a length more than twice that of the diameter of said aperture.

5. A method for fabricating threaded cylindrically shaped elements from a sheet of flat stock and comprising the steps of:

feeding successive portions of said flat stock into at least one work area;

cutting and stamping said portion of said flat stock in said work area to form an element having at least two appendages each of which is shaped into a half cylinder configuration truncated at one end and having the other end secured to the main body of said element;

cold working said half cylinder configurations to form threads thereon; and folding said element about predetermined folding lines along an arcuate path selected to bring together two of said half cylinder configurations to form a complete cylindrically shaped element with continuous threading thereon;

said folding lines bisecting straight lines which join the midpoints of said appendages where they in turn join said remaining portion of said flat stock and the center of said aperture;

said straight lines having a length more than twice that of the diameter of said aperture.

6. A method for fabricating threaded cylindrically shaped elements, from a sheet of flat stock and comprising the steps of:

feeding successive portions of said flat stock into at least one work area;

stamp cutting said portion of said flat stock in said work area to form an element having at least two pairs of appendages, with each appendage having a tab formed thereon;

cold working each tab into a half cylinder configuration which is truncated at one end thereof in a plane normal to the rotational axis of the half cylinder configuration, and having the other end thereof secured to the main body of said element;

cold working said half cylinder configurations to form threads thereon;

folding each appendage of each of said pairs of appendages about predetermined folding lines and along a portion of an arcuate path selected to bring the half cylindrical configurations on each pair of appendages together to form two complete cylindrically shaped elements, each with continuous threading thereon.

* * * * *